US011333029B2

(12) United States Patent
Bencini et al.

(10) Patent No.: US 11,333,029 B2
(45) Date of Patent: May 17, 2022

(54) METHOD FOR MANUFACTURING A STAGE OF A STEAM TURBINE

(71) Applicant: Nuovo Pignone Srl, Florence (IT)

(72) Inventors: Giacomo Bencini, Florence (IT); Marco Grilli, Florence (IT); Lorenzo Cosi, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 740 days.

(21) Appl. No.: 15/031,409

(22) PCT Filed: Oct. 20, 2014

(86) PCT No.: PCT/EP2014/072405
§ 371 (c)(1),
(2) Date: Apr. 22, 2016

(87) PCT Pub. No.: WO2015/059078
PCT Pub. Date: Apr. 30, 2015

(65) Prior Publication Data
US 2016/0265368 A1  Sep. 15, 2016

(30) Foreign Application Priority Data

Oct. 23, 2013  (IT) ................... CO2013A000051

(51) Int. Cl.
*F01D 25/32* (2006.01)
*F01D 5/30* (2006.01)
(Continued)

(52) U.S. Cl.
CPC .............. *F01D 5/3069* (2013.01); *B23C 3/18* (2013.01); *B23H 9/14* (2013.01); *F01D 5/021* (2013.01);
(Continued)

(58) Field of Classification Search
CPC ........ F01D 9/041; F01D 25/246; F01D 25/32; F01D 9/042; F01D 11/001; F01D 25/542
See application file for complete search history.

(56) References Cited

U.S. PATENT DOCUMENTS 2,527,285 A  10/1950 Whitehead et al.
3,881,842 A  5/1975 Kosyak et al.
(Continued)

FOREIGN PATENT DOCUMENTS

CN  101652534 A  2/2010
DE  102010007335 A1  8/2011
(Continued)

OTHER PUBLICATIONS

JP2009047142A Google Patents Translation Dec. 2, 2020.*
(Continued)

*Primary Examiner* — Sabbir Hasan
(74) *Attorney, Agent, or Firm* — Baker Hughes Patent Org.

(57) ABSTRACT

A method for manufacturing a stage of a steam turbine comprising the steps of milling a block of material to define a sector having a plurality of blades, each blade having an external surface; machining an opening in the external surface of at least one of the blades; machining a cavity in fluid communication with the opening; the step of machining the cavity being performed by wire electric discharge machining.

10 Claims, 5 Drawing Sheets

(51) Int. Cl.
  F01D 11/00 (2006.01)
  F01D 5/14 (2006.01)
  B23C 3/18 (2006.01)
  B23H 9/14 (2006.01)
  F01D 5/02 (2006.01)
  F01D 5/12 (2006.01)

(52) U.S. Cl.
  CPC .............. F01D 5/12 (2013.01); F01D 5/14 (2013.01); F01D 5/147 (2013.01); F01D 5/3038 (2013.01); F01D 11/006 (2013.01); F01D 11/008 (2013.01); F01D 25/32 (2013.01); *B23C 2215/44* (2013.01); *F05D 2220/31* (2013.01); *F05D 2230/10* (2013.01); *F05D 2230/12* (2013.01); *F05D 2230/51* (2013.01); *F05D 2230/53* (2013.01); *F05D 2300/10* (2013.01); *F05D 2300/431* (2013.01)

(56) References Cited

U.S. PATENT DOCUMENTS

| | | | |
|---|---|---|---|
| 6,135,711 | A | 10/2000 | Binder |
| 8,506,256 | B1 | 8/2013 | Brostmeyer et al. |
| 9,945,238 | B2 * | 4/2018 | Hashidate ............... F01D 9/04 |
| 2007/0025852 | A1 | 2/2007 | Camhi |
| 2010/0098537 | A1 | 4/2010 | Hamana |
| 2013/0149106 | A1 * | 6/2013 | Giusti .................. F01D 25/32 |
| | | | 415/115 |

FOREIGN PATENT DOCUMENTS

| | | | | |
|---|---|---|---|---|
| EP | 0872628 | A2 | 10/1998 | |
| EP | 1881163 | A1 | 1/2008 | |
| EP | 2216507 | A2 | 8/2010 | |
| EP | 2604801 | A1 | 6/2013 | |
| GB | 2420162 | A | 5/2006 | |
| GB | 2 424 454 | A | 9/2006 | |
| GB | 2424454 | A * | 9/2006 | ............. F01D 25/32 |
| JP | 56032005 | A * | 4/1981 | |
| JP | H02267301 | A | 11/1990 | |
| JP | 2001152807 | A | 6/2001 | |
| JP | 2002371805 | A | 12/2002 | |
| JP | 2007120321 | A | 5/2007 | |
| JP | 2009-047142 | A | 3/2009 | |
| JP | 2009047142 | A * | 3/2009 | |
| JP | 2009203948 | A | 9/2009 | |
| JP | 2010-144707 | A | 7/2010 | |
| WO | 20100149528 | A1 | 12/2010 | |

OTHER PUBLICATIONS

Unofficial English Translation of Chinese Office Action issued in connection with corresponding CN Application No. 201480058349.9 dated Nov. 28, 2016.

Italian Search Report issued for Italian application CO2013A000051 dated Mar. 25, 2014.

International Search Report and Written Opinion issued in connection with corresponding PCT application PCT/EP2014/072405 dated Dec. 3, 2014.

Machine Translation and Notification of Reasons for Refusal issued in connection with corresponding JP Application No. 2016-524598 dated Aug. 14, 2018.

* cited by examiner

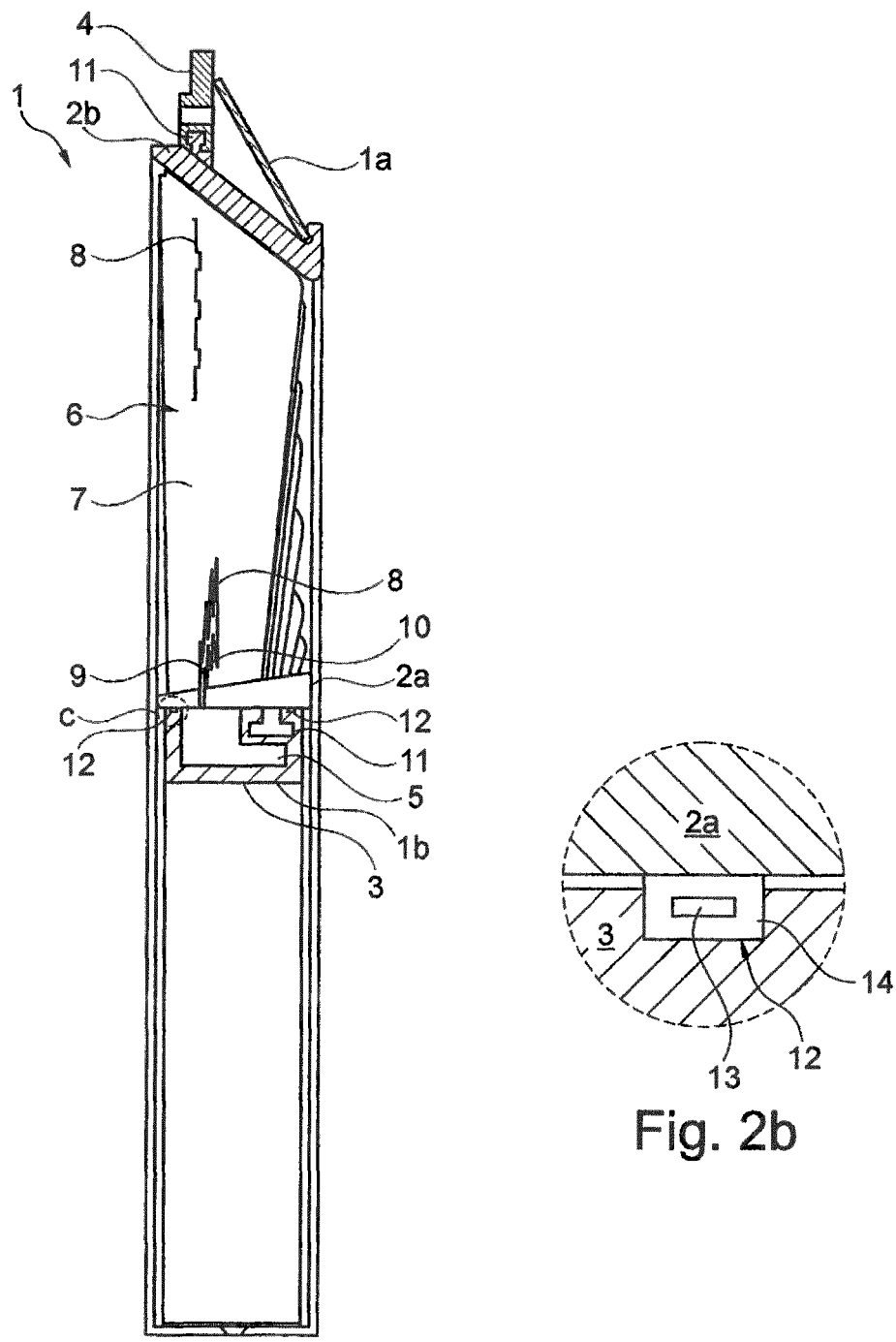

METHOD FOR MANUFACTURING A STAGE OF A STEAM TURBINE

BACKGROUND

Embodiments of the present invention relate to a method for manufacturing a stage of a steam turbine. Specifically, the method relates to the manufacturing of a stage having hollow blades.

In steam turbines, partial condensation of the steam occurs at their last stage or stages. In particular, condensation occurs on the airfoil portion of the stator blades of a so-called "condensing stage", typically the last stage of the turbine. If droplets are generated as a consequence of condensation, they leave the static stator blades and they hit the rotating rotor blades; therefore, damages to the rotor blades may occur. In order to reduce the damages caused by the droplets, the rotation speed of the rotor blades may be reduced. However, in this way the efficiency of the turbine is also reduced.

Alternatively, in order to reduce any damage on the rotor blades, solutions exist for collecting the condensation before the generation of droplets. The most typical of these solutions consists in using hollow stator blades where condensation is likely to occur, providing holes and/or slots through the airfoil portion of the blades extending from the airfoil surface to the internal cavity, and sucking from the internal cavity so to that any condensation leaves the airfoil surface and enters the internal cavity. In this way, the release of droplets can be highly reduced.

A method for manufacturing such stage of a steam turbine is therefore known. Such method comprises the steps of machining an inner and an outer ring having each a respective channel. Each of these rings has an internal surface with a plurality of holes in fluid communication with the channel. A plurality of turbine blades is manufactured, each blade having a respective opening and a hollow cavity in fluid communication with the external environment through the opening.

The blades are then welded to the rings. Specifically, each hole in a single ring is placed in fluid communication with the cavity of a respective blade. As a result, in the assembled stage the condensed water can be extracted through the opening of a blade, thus flowing into the cavity and then into the channel of one of the two rings.

SUMMARY OF THE INVENTION

A disadvantage of the above described prior art is in the welding phase of the above described method. Indeed, this step has to be performed both manually and within strict tolerances. This results in increased assembly time and, consequently, increased costs.

A first aspect of the invention is therefore a method for manufacturing a stage of a steam turbine. The method comprises the steps of milling a block of material to define sector with a plurality of blades; machining an opening in the external surface of at least one of the blades and a cavity in fluid communication with the opening. The step of machining the cavity is performed by wire electric discharge machining.

An advantage of this method is that it overcomes the problem of the prior art, since there is no more need to weld the blades manually. Indeed, in this method the direct intervention of the technician is kept to a minimum.

A second aspect of the invention is a sector for the assembly of a stage of a steam turbine. This sector comprises a central and a peripheral portion and a plurality of blades. Each blade is attached to the central and to the peripheral portions. At least one of the blades has an opening on a respective external surface and a cavity in fluid communication with the opening. The sector is machined out of a single block of material.

A third aspect of the invention is a stage for a steam turbine comprising a plurality of the above referenced sectors and at least a central and a peripheral guide. The sectors are sealed to the guides.

BRIEF DESCRIPTION OF THE DRAWINGS

Further details and specific embodiments will refer to the attached drawings, in which:

FIG. 2 is a sectional view of the stage of FIG. 1 along the plane B-8;

FIG. 2B is a schematic detail C from the sectional view of FIG. 2;

DETAILED DESCRIPTION

Figure 1:
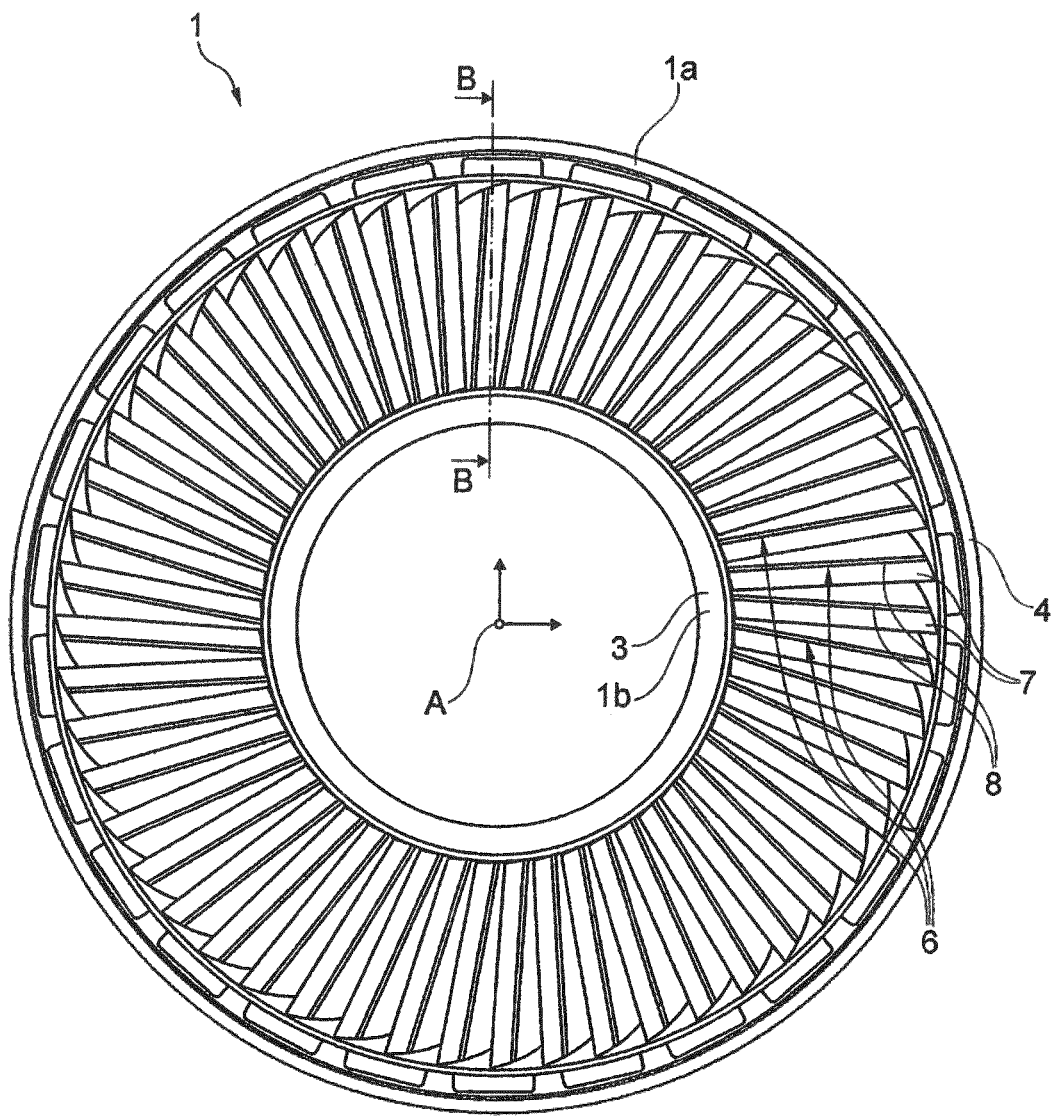
FIG. 1 is a perspective view of a stage of a steam turbine according to an embodiment of the present invention.

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Therefore, a stage of a steam turbine will be described by referring to the attached figures, in which will be indicated with the number 1.

The stage 1 has a central axis "A". The stage has a central zone 1a and a peripheral zone 1b with respect to the central axis "A". In other words, the central zone 1a can be considered an internal part of the stage 1, while the peripheral zone 1b can be understood as an external part of the stage 1 with respect to the central axis "A". The flow of steam inside the turbine is directed substantially along the central axis "A".

The stage 1 is provided with a plurality of blades 6. Each blade 6 projects radially from the central zone 1A to the peripheral zone 1B. Additionally, each blade 6 has an external surface 7, which is defined by an airfoil whose geometrical parameters are chosen depending on the specific application.

At least one of the blades 6, maybe several blades 6 and more particularly all of them, have an opening 8 on the external surface 7. Indeed, the blades 6 are also provided with a cavity 9 located in an internal zone. In other words, the blades 6 are hollow.

In detail, the cavity 9 extends along at least a portion of the radial length of the blade 6, more particularly along the full radial length of the blade 6. Each opening 8 likewise extends along at least a portion of the radial length of the blade 6. In the context of the present disclosure, by "radial length" is meant the length of the blade 6 along a radial direction, namely a direction perpendicular to the central axis "A" of the stage 1 and projecting from it. The opening 8 is configured so as to place the cavity 9 in fluid communication with a volume outside the blade 6.

More particularly, that the cavity 9 inside the blade 6 has an internal surface 10. The internal surface 10 is a ruled surface. In the context of the present disclosure, the term "ruled surface" is defined as a surface in which every point belongs to at least a straight line that lies fully on the surface itself. In other words, a ruled surface can be described as the set of points swept by a moving straight line. Examples of ruled surfaces are cylinders, cones or hyperboloids. A sphere is not a ruled surface.

Figure 2C:
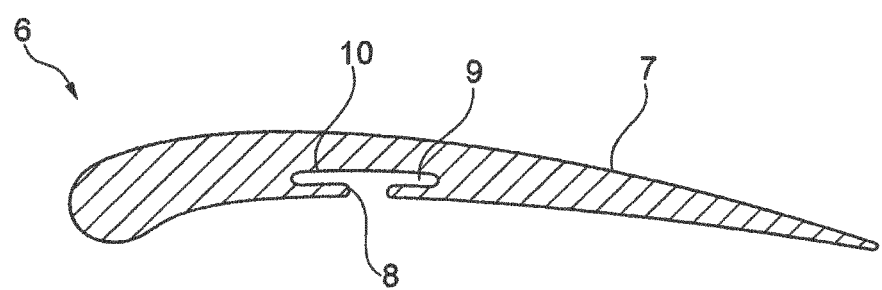
FIG. 2C is a sectional view of a detail of the stage of FIG. 1.

With reference to FIG. 2, please note that the cavity 9 appears jagged only because the plane B-B, shown in FIG. 1, is transversal to the blade 6. With reference to the section of the blade 6 shown in FIG. 2C, please note that the cavity 9 shown therein is a ruled surface as described above.

The stage 1 is provided with at least one channel 5, which can be located in the peripheral zone 1A and/or in the central zone 1B of the stage 1. With additional detail, the channel 5 can be placed in fluid connection with an internal zone of the turbine where the stage 1 is installed. More particularly, the channel 5 is placed in fluid communication with the cavities 9 of the blades 6.

The channel 5 itself can be placed in fluid connection with a low pressure zone (not shown) outside the turbine. In this way, part of the steam flow inside the turbine can be sucked through the openings 8, into the cavities 9 and then into the channel 5, thereby removing condensed steam from the external surface 7 of the blades 6.

According to one embodiment of the invention, the stage 1 comprises a plurality of sectors 2. In particular, each sector 2 is geometrically a circular sector, i.e. a sector of a circle or, more precisely, of a circular ring. Each sector 2 comprises a central 2B and a peripheral portion 2A, as well as a plurality of the above mentioned blades 6. Each blade 6 is attached to the central 2B and to the peripheral portion 2A.

The stage 1 also comprises a central 3 and a peripheral guide 4. Moreover, the sectors 2 are sealed to the guides 3, 4. Specifically, the central 2B and the peripheral portion 2A are attached each to the respective guide 3, 4.

With greater detail, both portions 2A, 2B are provided with a profiled rail 11 which fits into the respective guide 3, 4.

Indeed, the above mentioned channels 5 are defined between the sectors 2 and the guides 3, 4. Specifically, the peripheral portion 2A is coupled to the peripheral guide 4, thereby defining an outer channel 5. The central portion 2B is coupled with the central guide 3, thereby defining an inner channel 5. In order to isolate the channels 5 from the environment inside the turbine, appropriate channel seals 12 are provided between the sector 2 and the guides 3, 4.

These channel seals 12, schematically shown in FIG. 2B, comprise a core 13 of rigid material, maybe metal, more particularly steel. The channel seal 12 may also comprise a coating 14. The coating 14 can be made of a ceramic, composite or plastic material. With additional detail, in this arrangement the core 13 is sandwiched between two or more layers of coating 14.

Alternatively, the channel 5 can be made airtight by welding the sector 2 directly to the guides 3, 4.

As noted above, an embodiment of the present invention may or may not have both channels 5, but has at least one of them. Furthermore, even if two channels 5 are present they may or may not be used during normal operation.

Please note that, according to several embodiment of the invention, each sector 2 is machined out of a single block of material. In other words, each sector 2 is built as a single piece. More particularly, this allows to build a stage 1 of a turbine in which there is no welding between the blades 6 and the central 2B or the peripheral portion 2A.

In an embodiment of the present invention, the stage 1 comprises four sectors 2, each having an angular opening of 90° with respect to the central axis "A". In another embodiment of the invention, the stage 1 comprises two sectors 2 each having an angular opening of 180°. Other embodiments are possible, comprising different numbers of sectors 2 which have different angular openings.

More particularly, the guides 3, 4 have an angular opening of 180°. Therefore, the stage 1 in an embodiment comprises two central guides 3 and two peripheral guides 4.

The method according to an embodiment of the present invention therefore comprises the steps of machining a block of material to define a sector 2. Particularly, several sectors 2 are machined. In an embodiment, the machining is done by milling a block of material. More particularly, all sectors 2 of a stage 1 are milled out of a respective single block of material. During this step, the external shape of each sector 2 is defined, including the blades 6 with their respective external surfaces 7.

The cavity 9 is then cut into the external surface 7 of at least one of the blades 6. Specifically, according to an embodiment of the invention the cavity 9 is cut by wire electric discharge machining. For this reason, the resulting internal surface 10 of the cavity 9 is a ruled surface. The opening 8 is also machined during this step, more particularly by die-sink electric discharge machining.

The central guide 3, as well as the peripheral guide 4, are then manufactured. Any suitable known manufacturing technique can be employed; therefore, this step will not be further detailed. In an embodiment, the guides 3, 4 are manufactured with a slightly different curvature so that, when they are joined to the sectors 2, they are slightly deformed. As explained above, in this embodiment the guides 2, 4 have an angular opening of 180°.

Figure 3A:
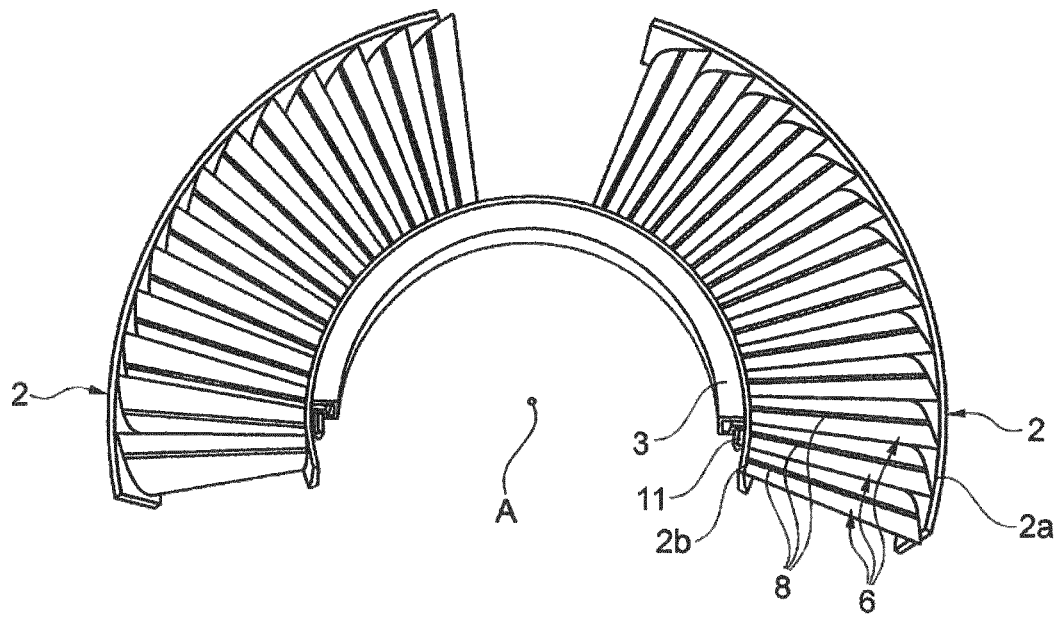
FIGS. 3A, 3B and 3C are perspective views of respective steps of the method for manufacturing a stage of a steam turbine according to an embodiment of the present invention.
Figure 3B:
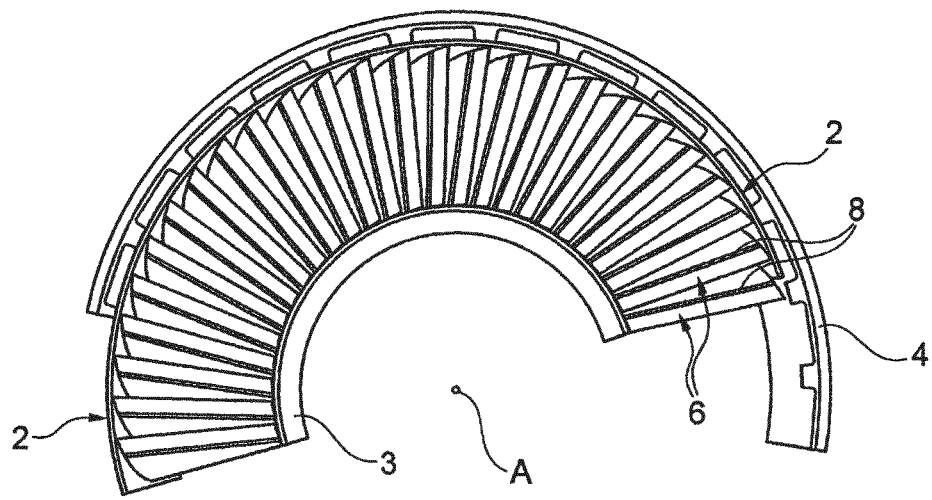

The sector 2 is then slid into the guides 3, 4. Specifically, two sectors 2 are slid on the central guide 3, as shown in FIG. 3a. Specifically, the profiled rail 11 from the central portion 2B of each sector 2 is inserted into the central guide 3. During this phase the central guide 3, which is not perfectly circular, is deformed elastically by the rail 11. In this way, the elastic deformation acts as a preload between the sector 2 and the central guide 3, so as to prevent an unwanted relative motion between the two components.

If a channel seal 12 is present between the central guide 3 and the sectors 2, it is installed during this phase.

The sectors 2 are then joined together. They can be either welded or a specific inter-sector seal (not shown in the drawings) may be employed. The inter-sector seal can comprise a core of rigid material, maybe metal and more particularly steel. The inter-sector seal may also comprise a coating of deformable material, possibly rubber or plastic.

The peripheral guide 4 is then placed over the two sectors 2. With greater detail, the peripheral guide 4 is deformed by the sectors 2 in the same way described above with reference to the central guide 3.

The sectors 2 are then sealed to the guides 3, 4. If channel seals 12 are employed this step can be skipped. Otherwise, this step is performed by welding the sector 2 to the guides 3, 4. This operation can be performed by machine welding, without the direct intervention of an operator.

Figure 3C:
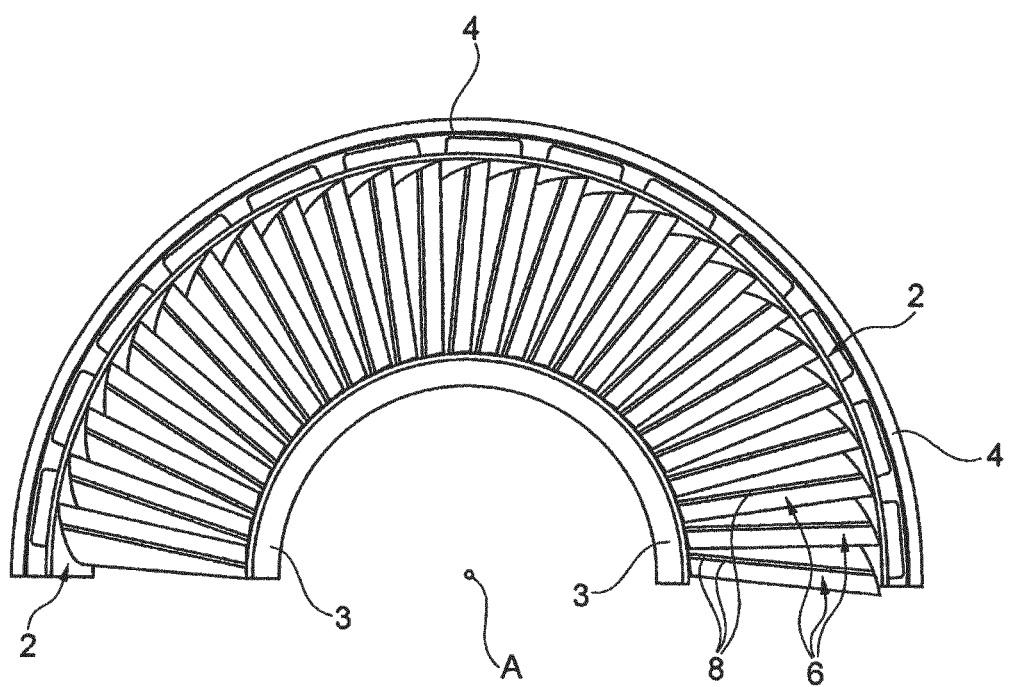

In this way, a half-stage is obtained, such as the one that is shown in FIG. 3C. By joining two half-stage, the above described stage 1 can be assembled.

Finally, it is to be noted that the above described steps are ordered for ease of description only. Indeed, if necessary the order can be changed, for example the sectors 2 can be joined before they are inserted into the guides 3, 4. Additionally, another embodiment is possible in which a sector 2 has an angular opening of 180°, thereby avoiding the need for the joining step.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sector for the assembly of a stage of a steam turbine, the sector comprising:
    a central portion and a peripheral portion; and
    a plurality of blades adjacently positioned relative to each other about a central axis and attached to the central portion and to the peripheral portion, each of the plurality of blades having an external surface having an inwardly curved portion, and at least one blade of the plurality of blades has a single opening on the inwardly curved portion of the respective external surface and a cavity in fluid communication with the single opening and in further fluid communication with a low pressure zone outside of the steam turbine, the single opening extending along the inwardly curved portion from the central portion to the peripheral portion,
    wherein the sector is a single piece formed from a single block of material.

2. The sector according to claim 1, wherein the central portion is configured to slide into a first guide and the peripheral portion is configured to slide into a second guide.

3. The sector according to claim 2, further comprising a first profiled rail located in the central portion and a second profiled rail located in the peripheral portion, the first and the second profiled rails configured to fit into the first guide and the second guide, respectively.

4. The sector according to claim 3, wherein the central portion is configured to be sealed with the first guide to define a first channel therebetween and the peripheral portion is configured to be sealed to the second guide to define a second channel therebetween.

5. The sector according to claim 4, wherein the cavity includes an internal ruled surface comprising a plurality of points, and each of the plurality of points belongs to at least one straight line that lies entirely on the internal ruled surface.

6. A stage for a steam turbine, the stage comprising:
    a central guide;
    a peripheral guide;
    a plurality of sectors, a first sector of the plurality of sectors is sealed to the central guide and the peripheral guide and comprising a central portion and a peripheral portion; and
    a plurality of blades adjacently positioned relative to each other about a central axis and attached to the central portion and to the peripheral portion, each of the plurality of blades having an external surface having an inwardly curved portion, and at least one blade of the plurality of blades has a single opening on the inwardly curved portion of the respective external surface and a cavity in fluid communication with the single opening and in further fluid communication with a low pressure zone outside of the steam turbine, the single opening extending along the inwardly curved portion from the central portion to the peripheral portion,
    wherein each sector of the plurality of sectors is a single piece formed from a single block of material.

7. The stage according to claim 6, wherein the central portion is sealed with the central guide to define a first channel therebetween and the peripheral portion is sealed to the peripheral guide to define a second channel therebetween.

8. The stage according to claim 7, wherein the central portion is configured to slide into the central guide and the peripheral portion is configured to slide into the peripheral guide.

9. The stage according to claim 8, further comprising a first profiled rail located in the central portion and a second profiled rail located in the peripheral portion, the first and the second profiled rails configured to fit into the central guide and the peripheral guide, respectively.

10. The stage according to claim 9, wherein the cavity includes an internal ruled surface comprising a plurality of points, and each of the plurality of points belongs to at least one straight line that lies entirely on the internal ruled surface.

* * * * *